(12) United States Patent
Landrieve

(10) Patent No.: US 6,984,072 B2
(45) Date of Patent: Jan. 10, 2006

(54) INSTRUMENTED BEARING FOR STEERING WHEEL

(75) Inventor: Franck Landrieve, Fondettes (FR)

(73) Assignee: Aktiebolaget SKF, Goteborg (SE)

( * ) Notice: Subject to any disclaimer, the term of this patent is extended or adjusted under 35 U.S.C. 154(b) by 71 days.

(21) Appl. No.: 10/415,825

(22) PCT Filed: Oct. 30, 2001

(86) PCT No.: PCT/FR01/03373

§ 371 (c)(1), (2), (4) Date: Oct. 9, 2003

(87) PCT Pub. No.: WO02/37058

PCT Pub. Date: May 10, 2002

(65) Prior Publication Data

US 2004/0046547 A1 Mar. 11, 2004

(30) Foreign Application Priority Data

Nov. 2, 2000 (FR) .................................. 00 14044

(51) Int. Cl.
*F16C 19/52* (2006.01)
*G01B 7/30* (2006.01)

(52) U.S. Cl. ..................... 384/448; 324/174

(58) Field of Classification Search ................ 384/446, 384/448; 324/207.25, 207.2, 207.21, 207.22, 324/174

See application file for complete search history.

(56) References Cited

U.S. PATENT DOCUMENTS

| 4,893,502 A | * | 1/1990 | Kubota et al. ........... 324/207.2 |
| 4,988,219 A | * | 1/1991 | Peilloud ..................... 384/448 |
| 5,880,586 A | * | 3/1999 | Dukart et al. ............ 324/207.2 |
| 6,771,065 B2 | * | 8/2004 | Pointer .................... 324/207.2 |

FOREIGN PATENT DOCUMENTS

| DE | 296 06 042 | 6/1996 |
| EP | 0 856 720 | 8/1998 |
| EP | 0 932 019 | 7/1999 |
| EP | 0 983 924 | 3/2000 |

\* cited by examiner

*Primary Examiner*—Thomas R. Hannon
(74) *Attorney, Agent, or Firm*—Young & Thompson

(57) ABSTRACT

An instrumented bearing, in particular for an electric steering wheel (12), comprises an outer element (1) and an inner element (6) whereof one is mobile relative to the other which is fixed, via at least a row of rolling elements (14) arranged between the elements, and by detection (22, 23, 31) of rotational parameters of the rotating element. The bearing further comprises electronic elements (34) for processing signals emitted by the detecting elements and electronic elements (35) for controlling at least an actuator electrically connected to the device, advantageously arranged on a printed circuit plate (33) fixed in rotation.

17 Claims, 3 Drawing Sheets

INSTRUMENTED BEARING FOR STEERING WHEEL

CROSS REFERENCE TO RELATED APPLICATION

This is the 35 USC 371 national stage of international application PCT/FR01/03373 filed on 30 Oct. 2001, which designated the United States of America.

The object of the present invention is an instrumented bearing device which can be used in particular in association with an electric steering wheel, for example for a fork lift truck or public works machinery.

FIELD OF THE INVENTION

The bearing is of the type comprising an external element and an internal element, between which at least a row of rolling elements is provided. One of these elements remains fixed relative to a structure, while the other can be rotated by the steering wheel. The instrumented bearing comprises detection means of the rotation parameters of the revolving element, so as to control an electric or electro-hydraulic solenoid.

An electric direction control is used more and more currently in conveyors, for example fork lifts or certain public works machinery. The steering wheel, rotated by the driver, is mounted on a support fixed by means of one or two bearings to which is added a rotation detection system, integrated or not into the bearings. This detection system emits a signal representative of the rotation of the steering wheel (angle, direction and angular speed) which is directed to a signal processing system, then to an electronic pilot logic system which in turn sends signals appropriate to electric or electro-hydraulic solenoids causing orientation of the vehicle wheels according to orders given by the driver.

An example of such a device is illustrated in French patent application 2 782 970, in which a system for braking the steering wheel has also been provided in order to generate a load moment favouring driving precision and reliability of the vehicle.

These already known devices, though technically satisfactory, nevertheless have certain disadvantages, especially in terms of compactness and ease of assembly on the vehicle or on the machine.

In conventional devices, for example those using Hall effect sensors cooperating with a multipolar magnetised ring, it is difficult to obtain absolute coding allowing the absolute angular position of the revolving part relative to a predetermined reference "zero" to be known, with the quality of measurement depending on the number and precision of the realisation of poles of the magnetised ring.

On the other hand, obtaining absolute coding by a multipolar ring supposes that the latter comprises additional information permitting identification of a reference pole, which occurs detrimentally to simplicity, cost and spatial requirement.

European patent application 0 932 01 9 describes a sensor comprising a rotating disc equipped with a magnetised rod capable of moving in front of a sensor comprising a magnetoresistor. This device utilised for determining angular position does not however comprise any bearing capable of ensuring suitable support of the revolving part. In addition, nothing is provided for integrated and reliable processing of the signal put out by the sensor.

BACKGROUND OF THE INVENTION

The object of the present invention is to eliminate the difficulties of previous devices and to create an instrumented bearing which is particularly compact and reliable, and which also allows precise determination of the absolute angular position.

The instrumented bearing according to the present invention, which can be used especially for an electric steering wheel of a conveyor fitted with an electric direction control system, comprises an external element and an internal element whereof one is mobile in rotation about an axis relative to the other which is fixed, by means of at least a row of rolling elements disposed between said elements. The device also comprises means of detection of rotation parameters of the revolving element which comprise a sensor sensitive to magnetism arranged on a fixed part and a permanent magnet arranged on a revolving part, opposite the sensor, with its polar parts on either side of the axis of rotation.

The permanent magnet is mounted on a front face of the revolving element, on the side opposite the steering wheel.

In this way, absolute coding of the angular displacement of the revolving part is attained very simply and thus economically.

In a preferred embodiment, the sensor sensitive to magnetism comprises a plurality of cells of Hall effect distributed around a point corresponding to the axis of rotation of the revolving part equipped with the permanent magnet.

The sensor sensitive to magnetism can be advantageously created in the form of an integrated circuit chip and may comprise a plurality of contact pins enabling an electric current supply, where the output of the signal and programming of a predetermined angular position from the fixed part define a zero reference angle.

In another embodiment, the sensor sensitive to magnetism comprises a magnetoresistor centred on the axis of rotation.

The sensor sensitive to magnetism is preferably fixed on a printed circuit board mounted fixed in rotation in a space defined between the bearing and a closing cover which can have a connector. In this way, the support means of the steering wheel and the ensemble of electric processing means of the signal are integrated in the form of a unit. Once this unit is fixed on a vehicle or a machine, it suffices to mount the steering wheel and to connect an electric cable on the connector to make the ensemble function.

The electronic means for processing the signals and the electronic pilot means are preferably disposed oh the printed circuit board which already houses the sensor sensitive to magnetism. In this case, a simple change of printed circuit easily allows the device to be adapted to another application.

The link between the connector borne by the cover and the printed circuit board is preferably done by contact means, thus avoiding any connection cable.

Preferably, the sensor supplies a signal of absolute angular position relative to a zero reference position.

In a preferred embodiment, the permanent magnet is mounted in a recess on the revolving element so as not to project outside said front face. The axial bulkiness of the device is thus reduced to the maximum.

In a variant, the permanent magnet can be supported by a piece solid with a rotating ring of the bearing or even can be supported directly by the rotating ring of the bearing.

In an advantageous embodiment, the revolving part bearing the permanent magnet and a part at least of the steering wheel, indeed all the steering wheel, form a single monobloc piece. Assembly is accordingly particularly simple.

In a variant, the rotating ring of the bearing directly supports the steering wheel.

The permanent magnet can be a bipolar magnetised rod or a cylindrical element whose poles are situated on either side of the axis of rotation of the revolving part.

SUMMARY OF THE INVENTION

The invention will be better understood from two particular embodiments described by way of non-limiting example and illustrated by the accompanying diagrams, in which:

FIG. 1 is an axial section of an embodiment of an instrumented bearing device according to the present invention, FIG. 2 diagrammatically illustrates a position taken up by the permanent magnet relative to the sensor sensitive to magnetism of the device in FIG. 1, and FIG. 3 diagrammatically illustrates a position taken up by a permanent magnet of cylindrical shape, according to a second embodiment, relative to an ensemble of cells of Hall effect.

BRIEF DESCRIPTION OF THE DRAWINGS

In the embodiment illustrated in FIG. 1, the instrumented rolling bearing device comprises an external element 1, of annular shape, made of pressed sheet in the example illustrated, comprising a tubular portion 2 and a radial portion 3 extending outwards at one end of the tubular portion. The radial portion 3 is provided with a plurality of fixing holes 4 for taking up screws for attaching to a fixed structure 5, illustrated diagrammatically.

DETAILED DESCRIPTION OF THE INVENTION

Figure 1:
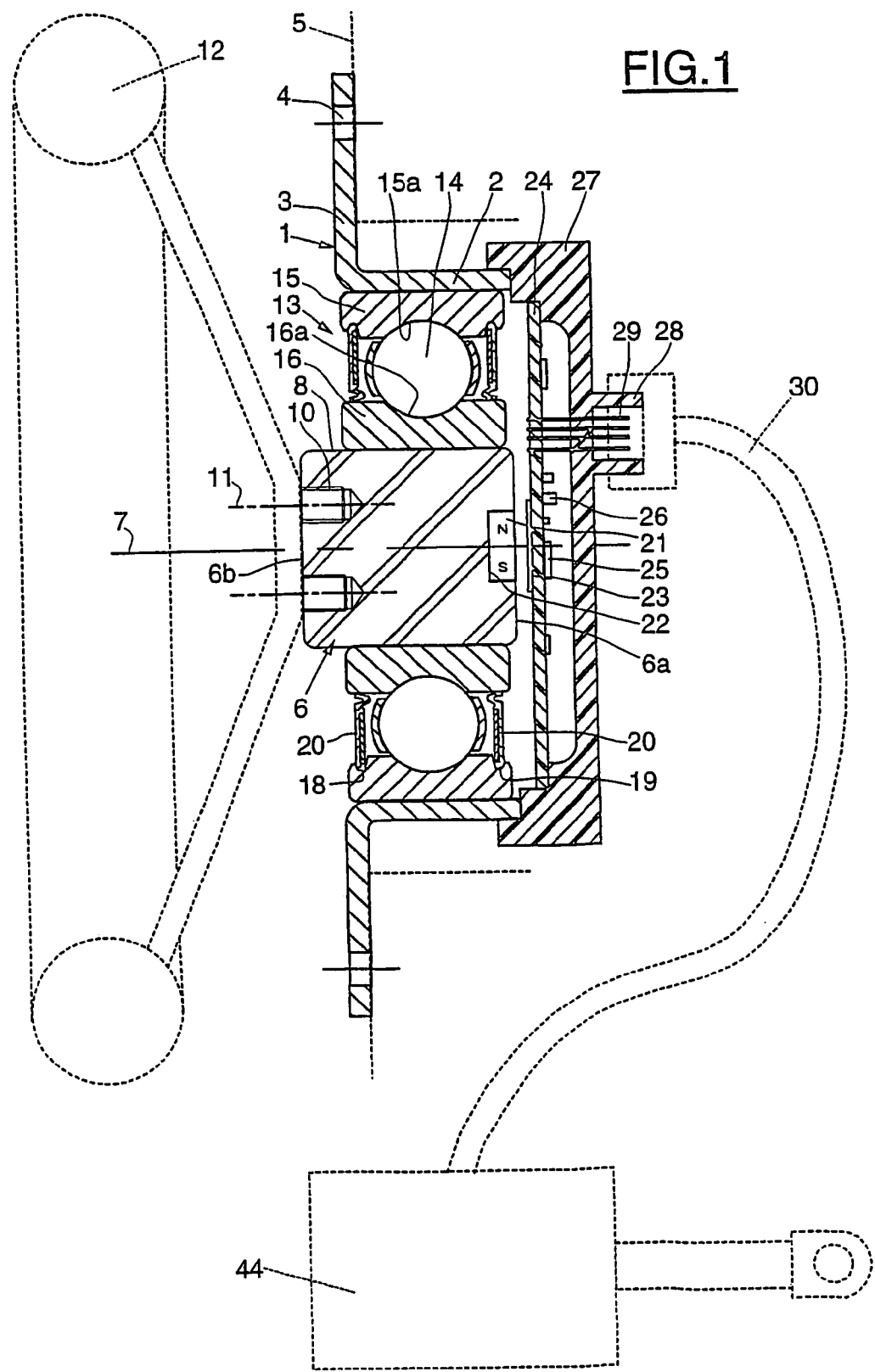

The bearing device further comprises an internal element 6 centred on the same axis 7 as the external element 1. The internal element 6 is in the form of a solid cylindrical piece having an external cylindrical span 8. A plurality of holes 10 is provided at one end of the revolving internal element 6 for taking up screws illustrated at 11, for example intended for attaching a rotating steering wheel 12, illustrated diagrammatically in dotted lines. The steering wheel 12 is fixed on an axial end of the revolving part supporting a magnet at its other end. The internal element 6 exhibits a radial face 6b from which the holes 10 are formed.

In the embodiment illustrated, a ball bearing 13 is mounted between the external element 1 and the internal element 6. The ball bearing 13 comprises a row of balls 14 disposed between an external ring 15 mounted in the bore of the tubular portion 2 of the external element 1, and an internal ring 16 mounted on the cylindrical span 8 of the internal element 6.

In a variant, it could well be that the rolling elements such as the balls 14 or rollers, needles, etc., are mounted directly in contact with the external elements 1 and internal elements 6 by means of races machined on said external and internal elements.

The external ring 15, embedded in the bore of the tubular portion 2 of the external element 1, is provided with a race 15a for the rolling elements 14. The internal ring 16, embedded on the cylindrical span 8 of the internal element 6, is provided with a race 16a for the rolling elements 14. The external ring 15 is also provided with two symmetrical grooves 18 and 19 embedded into its bore, on either side of the race 15a, enabling sealing elements 20, which rub against a span of the internal ring 16, to be attached.

The internal revolving element 6 comprises a permanent magnet 21 made in the form of a bipolar magnetised rod which is, in the illustrated example, lodged in a recess 22 machined on the front face 6a of the revolving internal element 6 so as not to project from this front face 6, faces 6a and 6b forming the opposite ends of the internal element 6. The permanent magnet 21 is arranged on the revolving internal element 6 opposite the steering wheel 12. The polar parts north and south of the permanent magnet 21 are arranged on either side of the axis of rotation 7.

The sensor sensitive to magnetism here is in the form of a magnetoresistor 23 disposed opposite the permanent magnet 21, slightly offset from the latter by an air gap, the magnetoresistor 23 being fixed on a printed circuit board 24 disposed in a radial plane and fixed on the fixed external element 2 by any appropriate means such as screws, adhesion etc. The printed circuit board 24 simultaneously comprises electronic means 25 for processing signals emitted from the magnetoresistor 23 and electronic means 26 constituting pilot logic for a solenoid, for example of the electro-hydraulic type, designated by reference numeral 44 and illustrated in FIG. 1 in dotted lines.

In the embodiment shown, the magnet 21 and the sensor are directly opposite one another. In a variant, the sensor can be mounted on the side opposite the board 24, that is, on the side of the electronic means 25 and 26. The magnet 21 and the sensor are then separated by the board 24, apart from the air gap.

The device in its entirety is formed on the side of the printed circuit board 24 by a radial partition in the form of closing cover 27 made of a synthetic material, for example, affixed by any suitable means to the external edges of the tubular portion 2 of the fixed external element 1. A radial partition originating directly from the tubular portion 2 could also be provided.

In the embodiment illustrated, the cover 27 also comprises a connector 28 whereof the pins 29 are connected electrically directly to the output of the pilot electronics provided on the printed circuit board 24. The connection is made in a fairly direct manner, without connection cable, with considerable compacity and by eliminating any deterioration risk. Transmission to the solenoid 44 of pilot orders resulting from rotation of the steering wheel 12 is done via the cable 30 which connects directly on the connector 28.

Figure 2:
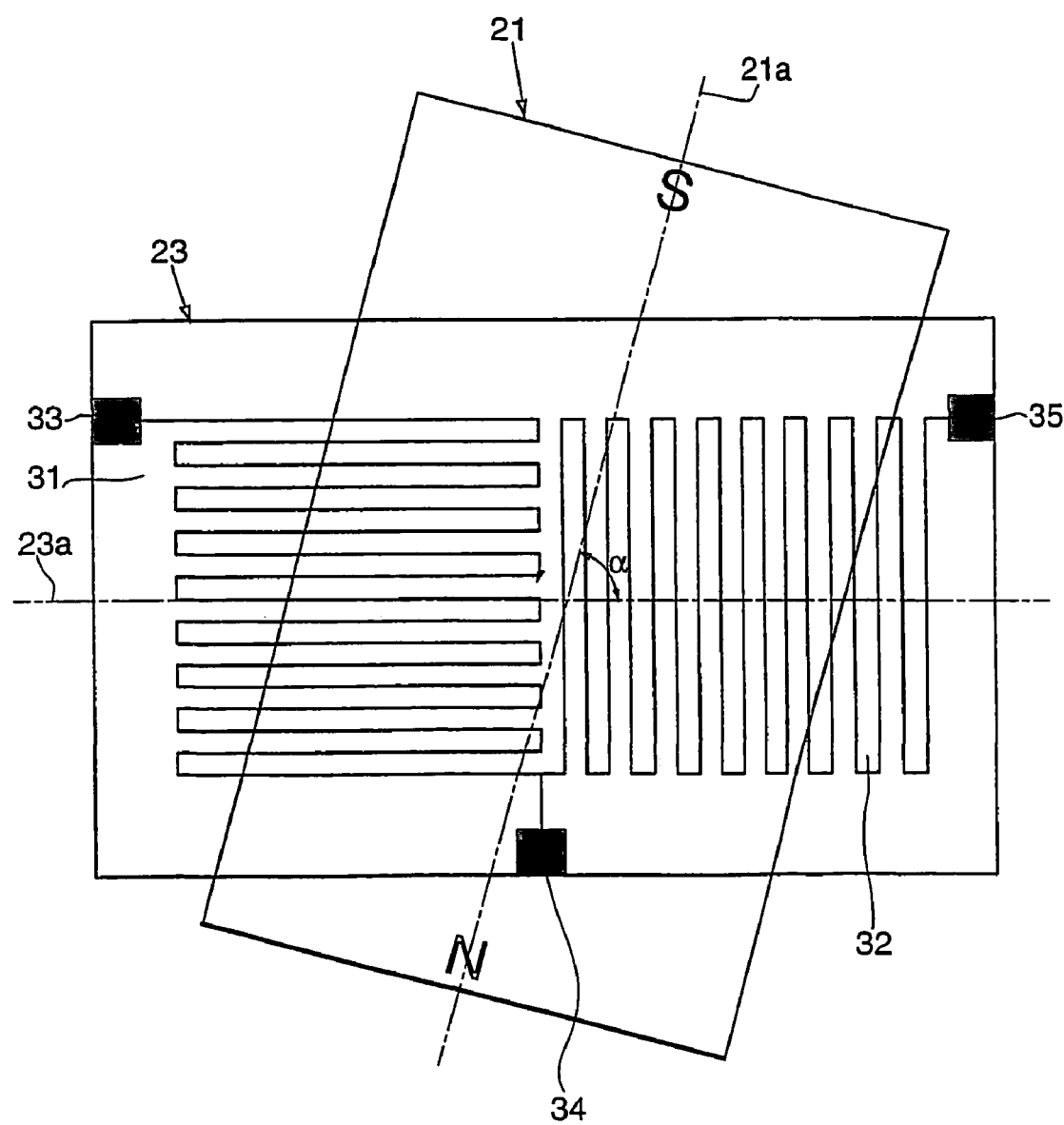

FIG. 2 illustrates in plan view and schematically the magnetoresistor 23 and the permanent magnet 21 shown in a particular relative position. By way of example, the respective axes of symmetry 23a and 21a of the magnetoresistor 23 and of the permanent magnet 21 make up between them an angle $\alpha$ which corresponds to rotation of the steering wheel 12.

The magnetoresistor 23 is in the form of a chip comprising two resistive conductor elements 31 and 32, each constituted in the form of resistive wires disposed in meanders elongated along an axis. The meanders of the resistive element 31 are disposed parallel to the longitudinal axis 23a, while the meanders of the resistive element 32 are disposed perpendicularly to the axis 23a. One of the ends of the resistive element 31 is connected to a supply terminal 33, while the other end is connected to an output terminal 34. Under the same conditions, the resistor element 32 is connected at one of its ends to an input terminal 35 and at its other end to the output terminal 34 which thus constitutes a terminal common to the two resistive elements 31 and 32.

Considering the disposition of the meanders making up the resistive elements 31 and 32, the variation in magnetic field to which the magnetoresistor 23 is subjected, for a determined angular position of the permanent magnet 21, generates in the magnetoresistor a variation in resistance, supplying an electric signal in the form of a current whose voltage is representative of the value of the angle α between the permanent magnet 21 and the magnetoresistor 23.

Figure 3:
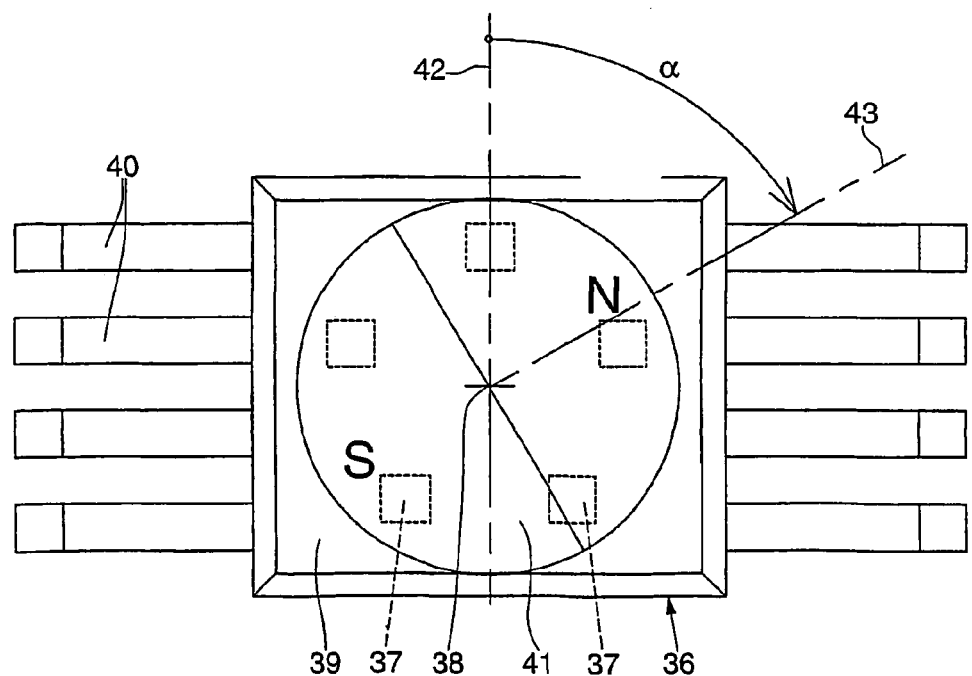

FIG. 3 illustrates a second embodiment in which the sensor sensitive to magnetism used, designed by 36 in its entirety, comprises a plurality of cells of Hall effect 37 numbering five in the illustrated example and distributed evenly around an imaginary point 38 through which the axis of rotation of the revolving part of the device passes. The cells of Hall effect 37 are integrated into a very small integrated circuit chip 39, having sides of a few millimetres and approximately 1 mm in thickness. The integrated circuit chip 39 advantageously comprises a pre-processing signal circuit, not shown in the figure, as well as a plurality of contact pins 40, here numbering six in the example illustrated, ensuring supply of electric current, with the output of the signal giving the absolute angular position as well as the programming of the position of the zero reference angle.

The permanent magnet 41 used in the embodiment illustrated in FIG. 3 is a cylindrical element whereof each demisector defines a pole magnetised north or south, as illustrated in the figure. The axis of the cylindrical element 41 is confused with the artificial point 38. Rotation of the magnet 41 in front of the different cells of Hall effect 37 causes in each cell 37 variations in electric output current in response to variations in the magnetic field. Integration of the variations in electric output current of each of the cells 37 supplies a signal representative of the angular position α of the magnet, the angle α being defined between the axis 42 which represents the zero reference position and the axis 43 joining the two poles north and south of the permanent magnet 41.

The device can thus be advantageously utilised to obtain coding supplying the absolute angular position of the revolving part relative to a determined zero position of the fixed part.

A braking element, not illustrated in the figure, can also be provided so as to generate a friction moment between the organs mobile in rotation and the fixed organs and thus improve the precision in rotation movements of the steering wheel. By way of example of such a braking element, reference can be made to French patent application no. 2 782 970.

The device according to the present invention thus makes it possible to obtain, with minimal bulkiness, in particular in the axial direction, absolute coding of the angular displacement of the rotating part.

The structure of the device allows use of a standard bearing comprising a suitable sealing device on each of its sides.

The compact structure of the device makes it possible to increase the reliability while the bearing is being handled by eliminating any risk of losing pieces, the sensitive elements also being perfectly well protected.

Even though in the embodiment described by way of example, the permanent magnet has been mounted on a revolving internal element, it is understood that in a variant the permanent magnet can be attached directly to the rotating ring of the bearing or again to another piece solid with this rotating ring.

In an advantageous embodiment it could also be envisaged to constitute the revolving internal element bearing the permanent magnet in the form of a monobloc piece with all or part of the steering wheel, thus further simplifying assembly and disassembly.

In another variant, the steering wheel could on the other hand be fixed directly on the rotating ring of the bearing.

Even though the description has been made in the illustrated example with an external element fixed to a revolving internal element, it is understood that the invention can also be applied without major modification to a structure in which the external element would be turning while the internal element would be fixed.

The invention offers a multi-use system in the form of a module which can be mounted on a fixed structure and which can be connected to different types of solenoids (electric solenoids for a road vehicle, a boat equipped with a "steer-by-wire" system, for example).

What is claimed is:

1. An instrumented bearing for electric steering wheel, comprising an external element and an internal element whereof one is mobile in rotation about an axis relative to the other which is fixed, by means of at least a row of rolling members disposed between said elements; the internal element or the external element comprising a steering wheel fixing surface; said bearing comprising detection means for detecting parameters of rotation of the rotating element; said detection means comprising a sensor sensitive to magnetism disposed on a fixed part; said sensor sensitive to magnetism being fixed on a printed circuit board mounted fixed in rotation in a space defined between the bearing and a partition forming said space, and a permanent magnet disposed on a revolving part, opposite said sensor, with the polar parts of the permanent magnet on either side of the axis of rotation.

2. The bearing according to claim 1, wherein the sensor sensitive to magnetism comprises a plurality of cells of Hall effect distributed around a point corresponding to the axis of rotation of the rotating part equipped with the permanent magnet.

3. The bearing according to claim 2, wherein the sensor sensitive to magnetism is made in the form of an integrated circuit chip.

4. The bearing according to claim 2, wherein the sensor sensitive to magnetism comprises a plurality of contact pins.

5. The bearing according to claim 1, wherein the sensor sensitive to magnetism comprises a magnetoresistor centered on the axis of rotation.

6. The bearing according to claim 1, wherein the partition is formed on a closing cover.

7. The bearing according to claim 1, wherein the partition comprises a connector.

8. The bearing according to claim 1, wherein the sensor supplies a signal of absolute angular position relative to a zero reference position.

9. The bearing according to claim 1, wherein the permanent magnet is mounted in a recess of the revolving element so as not to project outside a front face of the revolving element.

10. The bearing according to claim 1, wherein the permanent magnet is a bipolar magnetized or cylindrical element whereof the poles are located on either side of the axis of rotation of the rotating part.

11. An instrumented bearing for electric steering wheel, comprising an external element and an internal element whereof one is mobile in rotation about an axis relative to the other which is fixed, by means of at least a row of rolling members disposed between said element; the internal element or the external element comprising a steering wheel fixing surface; said bearing comprising detection means for detecting parameters of rotation of the rotating element; said detection means comprising a sensor sensitive to magnetism disposed on a fixed part and a permanent magnet disposed on a revolving part, opposite said sensor; said permanent magnet being mounted on a front face of the revolving element, at the side opposite the steering wheel; said permanent magnet being mounted in a recess of the revolving element so as not to project outside said front face.

12. The bearing according to claim 11, wherein the sensor sensitive to magnetism comprises a plurality of cells of Hall effect distributed around a point corresponding to the axis of rotation of the rotating part equipped with the permanent magnet.

13. The bearing according to claim 12, wherein the sensor sensitive to magnetism is made in the form of an integrated circuit chip.

14. The bearing according to claim 12, wherein the sensor sensitive to magnetism comprises a plurality of contact pins.

15. The bearing according to claim 11, wherein the sensor sensitive to magnetism comprises a magnetoresistor centered on the axis of rotation.

16. The bearing according to claim 11, wherein the sensor supplies a signal of absolute angular position relative to a zero reference position.

17. The bearing according to claim 11, wherein the permanent magnet is a bipolar magnetized or cylindrical element whereof the poles are located on either side of the axis of rotation of the rotating part.

* * * * *